Patented May 1, 1951

2,551,446

UNITED STATES PATENT OFFICE 2,551,446

ALGAECIDAL COMPOSITION COMPRISING A WATER-SOLUBLE CUPRIC SALT AND LIGNIN SULFONATE

Henry Clay Marks, Glen Ridge, N. J., assignor to Wallace & Tiernan Products, Inc., Belleville, N. J., a corporation of New Jersey No Drawing. Application November 19, 1947, Serial No. 787,036

10 Claims. (Cl. 167—16)

This invention relates to compositions and procedure for preventing the growth of micro-organisms in water or other aqueous liquids.

Copper is well known as an algaecide, germicide, and fungicide, and available in an inexpensive form as copper sulfate it is commonly used in water to prevent algae growths in reservoirs, swimming pools, cooling towers, and other water systems. In cooling and process water systems it can be used to prevent the growth of slime forming bacteria and fungi, its use in such systems being particularly advantageous to avoid slogging of the systems or interference with heat transfer effects or the like, and to obviate the frequent cleaning thereby necessitated.

In spite of its value as an algaecide copper in a convenient, soluble form such as copper sulfate is not completely satisfactory, for the copper precipitates, e. g. as the hydroxide, or apparently more usually as the basic carbonate, to a degree which increases as the pH and carbonate concentration of the water increases. In the carbonate, hydroxide, or like precipitated form the copper is less active against micro-organisms and the effect that it does have is only temporary because the precipitate settles out and is removed from the sphere of action. In addition, such precipitates cause undesirable turbidity, and scale or sludge deposits are also likely to result.

An important object of this invention is to provide a composition and a method of treatment of water and other aqueous liquids which prevents the precipitation of the copper and which at the same time does not interfere with its activity in destroying micro-organisms; other objects involve improvements in algaecidal compositions and procedures in various respects, including further advantages that will become apparent or are incidental to the practice of embodiments such as described below.

It has now been discovered that the material or type of material known as lignin sulfonate is remarkably effective in preventing the precipitation of the copper, while permitting full realization of the antimicrobial activity of the latter in any of a wide variety of concentrations. The lignin sulfonate may be in any of a number of forms, such as the sulfonic acid, the sodium salt, the calcium salt or other suitable salt. For example, the sodium salt referred to is commonly isolated directly from the waste liquors of the sulfite process used in the manufacture of paper. The sulfonic acid can be derived from these waste liquors by adding an acid. The calcium salt is obtained from the waste liquors by adding a soluble calcium salt. Although as explained below there is special advantage in purified types of the compound for the present invention, there is considerable utility in using cruder preparations, e. g. the waste liquor itself or simple concentrations of it. While the precise chemical structure of lignin sulfonate does not appear to have been elucidated, and even though there may be various types of lignins, depending on the wood used, and variations in the alteration of the lignin molecule and the degree of sulfonation in different sulfite pulping operations, it is understood that the substance is a definite compound, which equally characterizes both the crude and fully purified forms.

In the practice of the invention several methods of combining the lignin sulfonate with a soluble copper salt, as the algaecide, have been practicable. The soluble copper salt and the lignin sulfonates may be compounded together into a solid preparation or a concentrated aqueous solution; and then as combined they are added to the water to be treated. An alternative method which may be used is to add the copper salt and the lignin sulfonate to the water being treated as separate powders or solutions. However, when this method is practiced it is preferable in most cases to carry it out in such a way that the lignin sulfonate is present in the water under treatment, prior to the addition of the copper salt. Under such circumstances, the effectiveness of the lignin sulfonate is assured, in preventing precipitation of the copper. Once the copper has precipitated, the solubilizing action of the lignin sulfonate is very slow; therefore, it is preferable to avoid having the copper salt present alone for any substantial period of time before the lignin sulfonate is added. Satisfactory results may be obtained by supplying both substances simultaneously or even by adding the lignin sulfonate immediately after the copper. It is only necessary to have the solubilizing agent thoroughly dispersed before sufficient time elapses for the copper to precipitate.

In general, many cupric salts, e. g. the soluble cupric salts, are usable in destroying micro-organisms and in the treatment of water as outlined above. In practice, for example, copper sulfate, chloride, acetate and nitrate are all appropriate for the purpose, but of these the sulfate is somewhat preferable at least because it is the most readily available and is relatively inexpensive.

Likewise a wide variety of grades of lignin sulfonate are suitable. Experience appears to indicate that better results are obtained with those grades which have been somewhat purified by being precipitated out as a salt rather than by directly drying down the sulfite liquor. The latter preparations contain carbohydrates which to some extent serve as food for bacteria, algae and fungi, whereas the purified products have practically no effect in promoting the growth of micro-organisms. Nevertheless, as stated above, the crude lignin sulfonate compositions are definitely useful for the purposes of the present invention, nor do any of them contain materials that promote the growth of micro-organisms to anything like the same extent as compounds of the class exemplified by citric acid and tartaric acid, which have heretofore been suggested for use with copper sulfate and which are much more costly than either crude or purified lignin sulfonate.

The ratio of lignin sulfonate to copper which appears to be required for complete and effective results in keeping the copper dissolved varies with the absolute copper concentration and with the pH value of the water to be treated, and also with the alkalinity of the water. In water having neutral pH, values slightly less than 1 P. P. M. (part per million) of copper (measured as such) will usually remain dissolved under optimum conditions without the use of lignin sulfonate. Quantities of copper up to 5 P. P. M. can be held in solution by quantities about 0.1 as great, of a highly purified lignin sulfonate, while with a good commercial grade of lignin sulfonate the presently preferred minimum ratio of the lignin compound to copper is about 0.2:1.0 to 0.25:1.0, and with a relatively poor grade of the sulfonate, rises to about 0.5:1.0. It has been found that the ratio increases with increase of the copper concentration; for example, with quantities of copper in the neighborhood of 10 P. P. M. (measured as copper alone), the minimum quantity of a good commercial lignin sulfonate necessary for preferred results is an amount equal to about one-half the quantity of copper, and the corresponding requirement of a relatively poor commercial grade of the lignin sulfonate is an amount approximately the same as that of the copper. Similarly considered, twenty to fifty P. P. M. copper require more lignin sulfonate than copper when a poor grade of the former is used, and with values of the order of 800 P. P. M. of copper there should preferably be used about twelve times as much (i. e. twelve times the quantity of copper) of the poorer grade of lignin sulfonate as a solubilizer.

For a more detailed and specific illustration of the invention several examples of compositions which have been satisfactorily employed are described below. One example of a solid composition that has been used comprises 120 parts by weight of sodium lignin sulfonate mixed with 480 parts by weight of $CuSO_4 5H_2O$ (crystalline copper sulfate). The mixture was ground for four hours in a ball mill and was obtained in the form of a fine brown powder with a greenish cast. The product thus obtained may be added directly to the water being treated or it may first be made into a concentrated aqueous stock solution.

A second example of the composition, somewhat preferable to the preceding example, was prepared as follows: 320 parts by weight of crystalline $CuSO_4 5H_2O$ were passed through a 20 mesh screen, and 40 parts by weight of a good commercial grade of sodium lignin sulfonate were mixed with the copper sulfate until uniform. The mixture was then wet with 40 parts of water and the mixing was continued until a damp granulation was obtained. The material was then passed through a 10 mesh sieve and air dried overnight at room temperature, yielding a product in a form particularly convenient for use in treating aqueous liquids to prevent growth of algae and the like.

A stock solution which has also been used to treat water for the described purposes was made by mixing 294 volumes of an aqueous solution containing 100 grams per liter of $CuSO_4 5H_2O$ with 19 volumes of an aqueous solution containing 100 grams per liter of sodium lignin sulfonate.

A further example of the composition was prepared in the following manner: 2 parts of copper sulfate ($CuSO_4 5H_2O$) and 1 part of calcium lignin sulfonate were ground together to a fine mixture. This particular formulation was designed for treatment of a water of relatively high alkalinity where high concentrations of copper appeared necessary because the organisms present were resistant, experience indicating that under such circumstances relatively high ratios of lignin sulfonate to copper are desirable. Generally speaking, moreover, as the alkalinity of the water becomes greater, all required ratios of lignin to copper also become greater.

The efficacy of the composition of this invention is evident from the results of extended test and experimentation. In one series of tests a sample of water at pH 8 containing 300 P. P. M. carbonate was treated at room temperature with copper sulfate and then divided into portions, some of which were immediately treated with sodium lignin sulfonate and some of which were not. Portions of another sample of the same water were used as controls, without either copper sulfate or lignin sulfonate. After standing a while all portions were filtered and then inoculated with a gram-negative, slime-forming, resistant bacteria. The several samples or portions were then stored at room temperature and the growth of the bacteria observed. Portions which had been treated with 10 P. P. M. copper but without lignin sulfonate permitted the bacteria to grow just as profusely as untreated portions, i. e. the control sample. In portions treated with lignin sulfonate, i. e. containing 10 P. P. M. of copper and 5 or 10 P. P. M. of the lignin sulfonate, no growth whatsoever was observed.

In another set of tests similarly constituted, carbonate-containing samples of water were contaminated by adding .005% peptone, which would greatly promote the growth of micro-organisms. The samples were then treated with copper sulfate, in various amounts, some portions with, and some without lignin sulfonate, and filtered. All samples were then inoculated with a suspension of Aerobacter aerogenes. Three hours after the inoculation portions were withdrawn and treated with sulfide to inactivate the copper, and samples were plated on nutrient agar to determine the number of living organisms remaining. Five parts per million of copper, without lignin sulfonate, gave no noticeable reduction in the number of bacteria. The same amount of copper with 5 or 10 P. P. M. lignin sulfonate completely killed the organisms. Two parts per million copper with 4 P. P. M. lignin sulfonate killed 80% of the organisms. It will be understood that algae are considerably more sensitive to copper and are killed by lower concentrations than are required in examples of the sort just given where the particular purpose was to kill bacteria.

Although the utility of the described compositions and procedure has been fully demonstrated (as by the foregoing and other tests), and is thus independent of the accuracy of any theoretical considerations, it is at present believed that the lignin sulfonate solubilizes the copper because of the fact that it forms a complex compound with the latter by means of so-called co-ordinate bonds. Lignin sulfonate is understood to contain hydroxyl groups which are now believed to have this effect under the described circumstances, e. g. at least at the time the copper salt and the lignin sulfonate become incorporated in the water under treatment. Available evidence tends to indicate that the well known surface activity of the lignin sulfonate is probably not instrumental in the present solubilization process; for instance, a number of compounds which are otherwise unrelated but which might be classed as having similar surface activity have not been found to solubilize copper in this way.

Likewise, there is some direct evidence for compound formation such as mentioned above. For example, in one test, solutions containing different ratios of lignin sulfonate to copper sulfate were dialyzed against running water. In all the solutions the copper sulfate was in excess of what might theoretically combine with the lignin sulfonate in the manner indicated above. The solution remaining after dialysis was in each case then evaporated to dryness. Each portion yielded a pure powder containing 9 to 10% copper by weight. The fact that the percentage of copper was the same in each case although the initial ratio of copper to lignin varied tends to demonstrate that a complex compound of the suggested character was formed; the dialysis removed the excess copper sulfate each time, and what remained was apparently the complex compound. At the same time, other tests have indicated that the improved algaecidal compositions and procedures may be used (to obtain satisfactory results in preventing precipitation of the copper) with a relatively large proportion of copper per unit weight of lignin sulfonate, i. e. much higher ratios than were employed in the dialysis tests mentioned above; and in consequence, it appears that additional copper can be bound to the lignin sulfonate by weaker valence bonds.

As stated above, the procedure of the invention may be practiced in a number of ways, e. g. by supplying a previously prepared composition of the described character to the water under treatment, or by introducing the reagents separately. In any case the frequency or manner in which increments of the compounds are added from time to time need only be such as to maintain the desired content of dissolved copper in the water; for example, the feed may be at a suitable continuous rate for liquid in the main or for other continuous, non-returning streams, while recirculated bodies such as cooling water systems, swimming pools and the like may require successive additions of the algaecidal composition only at infrequent intervals. However employed, the present invention permits maintenance of an effective amount of dissolved copper in the water, against the tendency of carbonate or other influence (e. g. air or various gases) to precipitate the copper, and affords a strong and persistent activity against micro-organisms, at low cost and without any objectionable effect on the properties of the aqueous liquid thus processed. It will be appreciated that unless the contrary is expressly indicated, references herein to algaecidal compositions are intended to include compositions of like constitution which may happen in fact to be intended or used for preventing growth of fungi, or of slime-forming bacteria or for analogous purposes, in addition to or instead of action against algae per se—it being contemplated that in its broader aspects the invention is directed to the inhibition or suppression of any of various types of micro-organisms such as are mentioned hereinabove.

It will be understood that the invention is not limited to the specific compositions and procedures delineated in this disclosure but may be carried out in other ways without departure from the spirit of the invention as defined by the claims.

What is claimed is:

1. An algaecidal composition comprising a water soluble cupric salt, and lignin sulfonate, said composition being substantially free of carbohydrates.

2. An algaecidal composition consisting of: (a) carbohydrate-free material comprising a water soluble cupric salt and (b) sulfite waste liquor substantially purified with respect to carbohydrates.

3. An algaecidal composition comprising a water soluble cupric salt, and sulfite waste liquid material containing lignin sulfonate, said composition being substantially free of carbohydrates.

4. An algaecidal composition comprising copper sulfate and lignin sulfonate, said composition being substantially free of carbohydrates.

5. An algaecidal composition comprising a water soluble cupric salt and sodium lignin sulfonate, said composition being substantially free of carbohydrates.

6. An algaecidal composition comprising a water soluble cupric salt and calcium lignin sulfonate, said composition being substantially free of carbohydrates.

7. An algaecidal composition for treating water, consisting essentially of copper sulfate and a constituent associated therewith adapted to inhibit precipitation of the copper by carbonate in the water, said constituent comprising lignin sulfonate and being substantially free of carbohydrates.

8. In the method of treating an aqueous liquid to prevent the growth of micro-organisms therein, by dissolving copper sulfate in the liquid, the improvement which consists in supplying lignin sulfonate to the liquid to maintain the copper therein in dissolved form, said lignin sulfonate being supplied to the liquid not substantially later than the time of supplying said copper sulfate thereto.

9. In the method of treating an aqueous liquid with a water soluble cupric salt, introduced therein to prevent the growth of micro-organisms in such liquid, the improvement in maintaining the copper in dissolved form against copper-precipitating influences in the liquid, which consists in treating the cupric salt, in solution, with lignin sulfonate not substantially later than the time of introduction of the cupric salt in the liquid, said lignin sulfonate being supplied in amount sufficient to act as solubilizing agent for the cupric salt, and keeping said lignin sulfonate in solubilizing relation to the cupric salt during the treatment of the liquid with the latter.

10. The method of treating an aqueous liquid to prevent the growth of micro-organisms therein which comprises introducing a water-soluble cupric salt in the liquid and maintaining the copper in dissolved form against copper-precipitating influences in the liquid and thereby maintaining the effectiveness of the copper against micro-organisms, by incorporating in the liquid, at a time not substantially later than the time of introduction of the cupric salt, lignin sulfonate in amount to act as solubilizing agent for the copper.

HENRY CLAY MARKS.

REFERENCES CITED

The following references are of record in the file of this patent:

UNITED STATES PATENTS

| Number | Name | Date |
| --- | --- | --- |
| 1,762,709 | Alvord | June 10, 1930 |
| 1,866,069 | Wilcoxon | July 5, 1932 |
| 2,089,612 | Kubelka | Aug. 10, 1937 |
| 2,400,863 | Gelfand | May 21, 1946 |